United States Patent
Ballapuram et al.

(10) Patent No.: US 10,275,180 B2
(45) Date of Patent: Apr. 30, 2019

(54) ETHERNET SSD SYSTEM INCLUDING STORAGE OFFLOAD ENGINE (SOE) CONTROLLER AND ETHERNET SWITCH

(71) Applicant: Samsung Electronics Co., Ltd., Suwon-si, Gyeonggi-do (KR)

(72) Inventors: Chinnakrishnan Ballapuram, San Jose, CA (US); Ajay Sundar Raj, San Jose, CA (US); Robert Brennan, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 2 days.

(21) Appl. No.: 15/654,493

(22) Filed: Jul. 19, 2017

(65) Prior Publication Data
US 2018/0321876 A1 Nov. 8, 2018

Related U.S. Application Data

(60) Provisional application No. 62/503,319, filed on May 8, 2017.

(51) Int. Cl.
*G06F 3/06* (2006.01)
*H04L 29/08* (2006.01)
*H04L 12/879* (2013.01)

(52) U.S. Cl.
CPC ............ *G06F 3/0659* (2013.01); *G06F 3/065* (2013.01); *G06F 3/0679* (2013.01); *H04L 49/901* (2013.01); *H04L 67/1097* (2013.01)

(58) Field of Classification Search
CPC ...... G06F 3/0659; G06F 3/065; G06F 3/0679; H04L 49/901; H04L 67/1097
See application file for complete search history.

(56) References Cited

U.S. PATENT DOCUMENTS 6,917,987 B2 7/2005 Parthasarathy et al.
7,200,716 B1 * 4/2007 Aiello ................... G06F 3/0607
  709/226

(Continued)

OTHER PUBLICATIONS

Couvert, "High Speed I/O Processor for NVMe over Fabric (NVMEoF)," Proceedings of the 2016 Flash Memory Summit, Aug. 8-11, 2016, 18 pages.*

(Continued)

*Primary Examiner* — Glenn Gossage
(74) *Attorney, Agent, or Firm* — Renaissance IP Law Group LLP (57) ABSTRACT

An Ethernet solid-state drive (Ethernet SSD or eSSD) system and corresponding method provide improved latency and throughput associated with storage functionalities. The eSSD system includes at least one primary SSD, at least one secondary SSD, an Ethernet switch, and a storage-offload engine (SoE) controller. The SoE controller may operate in a replication mode and/or an erasure-coding mode. In either mode, the SoE controller receives a first write command sent from a remote device to at least one primary SSD. In the replication mode, the SoE controller sends a second write command to the at least one secondary SSD to replicate data associated with the first write command at the at least one secondary SSD. In the erasure-coding mode, the SoE determines erasure codes associated with the first write command and manages distribution of the write data and associated erasure codes. The SoE controller may also receive read commands, data cloning commands and data movement commands from the remote device.

8 Claims, 4 Drawing Sheets

(56) References Cited

U.S. PATENT DOCUMENTS

| | | |
|---|---|---|
| 8,880,937 B2 | 11/2014 | Armstrong et al. |
| 2008/0104337 A1 | 5/2008 | VelurEunni |
| 2015/0254003 A1 | 9/2015 | Lee et al. |
| 2015/0378640 A1* | 12/2015 | Huang .................. G06F 3/0661 |
| | | 709/217 |
| 2016/0094619 A1* | 3/2016 | Khan ...................... H04L 67/10 |
| | | 709/203 |
| 2017/0048322 A1 | 2/2017 | DeSanti |
| 2017/0357610 A1* | 12/2017 | Thompson .......... G06F 13/4282 |
| 2018/0032463 A1* | 2/2018 | Olarig ................ G06F 13/4022 |
| 2018/0095915 A1* | 4/2018 | Prabhakar ............... G06F 9/455 |
| 2018/0101376 A1* | 4/2018 | Olarig ........................ G06F 8/65 |
| 2018/0173466 A1* | 6/2018 | Yang ..................... G06F 3/0659 |
| 2018/0210785 A1* | 7/2018 | Olarig .................. G06F 11/085 |
| 2018/0239540 A1* | 8/2018 | Kachare ............... G06F 3/0611 |
| 2018/0260135 A1* | 9/2018 | Hayashida ............ G06F 3/0611 |
| 2018/0284989 A1* | 10/2018 | Kachare ................. G06F 3/065 |

OTHER PUBLICATIONS

NVM Express over Fabrics specification, Revision 1.0, Jun. 5, 2016, 49 pages.*

* cited by examiner

ETHERNET SSD SYSTEM INCLUDING STORAGE OFFLOAD ENGINE (SoE) CONTROLLER AND ETHERNET SWITCH

CROSS-REFERENCE TO RELATED APPLICATION

This patent application claims the priority benefit under 35 U.S.C. § 119(e) of U.S. Provisional Patent Application No. 62/503,319, filed on May 8, 2017, the disclosure of which is incorporated herein by reference in its entirety.

TECHNICAL FIELD

The subject matter disclosed herein generally relates to storage systems, and more particularly, to a system and a method for providing storage functionality in an Ethernet solid-state drive (eSSD) system.

BACKGROUND

As compute nodes are evolving to include Ethernet/Fabric Switches, the compute functionality associated with compute nodes (such as control of replication, erasure coding, data movement, file cloning, input/output (IO) determinism, etc.) tends to be shifted either to a host/initiator or to target storage devices. If the increased functionality is shifted to a remote host or an administrator, the increased functional load may cause further functional burdening of the remote host and/or administrator, and/or may add computational complexity to target storage devices, thereby increasing costs. Further, target storage devices are normally slave-type devices, and storage requests, such as read/write/administrative requests, are not normally initiated by a slave-type device. Accordingly, a target storage device would need to become a master-type device, similar to a host, in order to act as an initiator for various offload functionalities.

Further, existing non-volatile memory express/non-volatile memory express over fabric (NVMe/NVMe-oF) and/or other storage protocols do not natively and/or cleanly support the concept of a target storage device acting as a master initiator, which limits direct implementation of storage-offload or storage-acceleration functionalities provided by an SSD. Further, if a remote host initiator is a first initiator that is in communication with a first target SSD, another remote host initiator (or another second SSD that supports storage-offload functionalities) is not able to initiate a transfer-type operation or any other communication to the first target SSD until the first target SSD closes the transport function and connection.

Even further, a drive-centered solution to provide increased storage functionality may increase traffic and reduce bandwidth because the remote host control and data traffic interferes with the storage-offload functionality control and data traffic that needs to be shared at the lowest level.

SUMMARY

An example embodiment provides an eSSD system that may include at least one primary SSD, at least one secondary SSD, an Ethernet switch and a storage-offload engine (SoE) controller. The Ethernet switch may be coupled to the at least one primary SSD and the at least one secondary SSD. The SoE controller may be coupled to the Ethernet switch. The SoE controller may receive a first write command sent from a remote device to the at least one primary SSD. The SoE controller may send a second write command to the at least one secondary SSD to replicate data associated with the first write command at the at least one secondary SSD where the second write command may be a replica or modified version of the first write command. In an erasure-coding mode, the SoE controller in response to the first write command may send a first read command to the at least one primary SSD and to erasure-coding group peers of the at least one primary SSD. The SoE controller may determine a new stripe data and a new erasure coding data based on responses to the first read command, and may send a second write command associated with the new erasure coding to the at least one primary SSD and to erasure-coding peers of the at least one primary SSD. The SoE controller may receive a data-cloning command from the remote device sent to the at least one primary SSD, and the SoE controller may control cloning of data associated with the data-cloning command in at least the at least one primary SSD. The SoE controller may receive a data-movement command from the remote device sent to the at least one primary SSD, and the SoE controller may control movement of data associated with the data-movement command within at least the at least one primary SSD.

An example embodiment provides an eSSD system that may include at least one primary SSD, at least one secondary SSD, an Ethernet switch and an SoE controller. The Ethernet switch may be coupled to the at least one primary SSD and the at least one secondary SSD. The SoE controller may be coupled to the Ethernet switch, the at least one primary SSD and the at least one secondary SSD. The SoE controller may operate in a replication mode, in an erasure-coding mode, or in a combination thereof. The SoE controller may receive a first write command sent from a remote device to the at least one primary SSD. If the SoE controller is operating in the replication mode or a combination of the replication mode and the erasure-coding mode, the SoE controller in response to the first write command may at least: send a second write command to the at least one secondary SSD to replicate data associated with the first write command in the at least one secondary SSD where the second write command may be a replica or a modified version of the first write command. If the SoE controller is operating in the erasure-coding mode or a combination of the replication mode and the erasure-coding mode, the SoE controller in response to the first write command may at least: send a first read command to the at least one primary SSD and to erasure-coding peers of the at least one primary SSD, receive stored data in response to the first read command and determine a new erasure coding based on the first write command. The SoE controller may send a third write command associated with the new erasure coding to the at least one primary SSD and to erasure-coding peers of the at least one primary SSD.

An example embodiment provides a method to provide storage offload functionality in an Ethernet solid-state drive (eSSD) system, which method may include: receiving at a storage-offload engine (SoE) controller of the eSSD system a first write command sent from a remote device to at least one primary SSD of the eSSD system where the eSSD system may include the at least one primary SSD, at least one secondary SSD and an Ethernet switch coupled to the at least one primary SSD and the at least one secondary SSD, and the first write command may store data in the at least one primary SSD; and sending, by the SoE controller, a second write command to the at least one secondary SSD to replicate data associated with the first write command in the secondary SSD where the second write command may be a replica or a modified version of the first write command. If the SoE controller is in an erasure-coding mode, the method may further include: sending, by the SoE controller, a first read command to the at least one primary SSD and to erasure-coding peers of the at least one primary SSD; receiving at the SoE controller stored data and erasure coding associated with the stored data in response to the first read command; determining a new erasure coding based on the first write command; and sending by the SoE controller, a third write command associated with the new erasure coding to the at least one primary SSD and to erasure-coding peers of the at least one primary SSD.

An example embodiment provides an eSSD system that may include at least one SSD, an Ethernet switch and an SoE controller. The at least one SSD may include a primary storage area and a secondary storage area. The Ethernet switch may be coupled to the at least one SSD. The SoE controller may be coupled to the Ethernet switch and the at least one SSD. The SoE controller may receive a first write command sent from a remote device to the at least one SSD to store data in the primary storage area, and the SoE controller may send a second write command to the at least one SSD to replicate data associated with the first write command within the secondary storage area in which the second write command may be a replica or a modified version of the first write command. In an erasure-coding mode, the SoE controller, in response to the first write command, may send a first read command to the at least one SSD. The SoE controller may determine a new stripe data and new erasure coding data based on a response to the first read command. The SoE controller may send a second write command associated with the new erasure coding to the at least one SSD.

An example embodiment provides an eSSD system that may include at least one SSD, an Ethernet switch and an SoE controller. The at least one SSD may include a primary storage area and a secondary storage area. The Ethernet switch may be coupled to the at least one SSD. The SoE controller may be coupled to the Ethernet switch and the at least one SSD. The SoE controller may operate in a replication mode, in an erasure-coding mode, or in a combination thereof. The SoE controller may receive a first write command sent from a remote device to the at least one SSD. If the SoE controller is operating in the replication mode or a combination of the replication mode and the erasure-coding mode, the SoE controller in response to the first write command may at least: send a second write command to the at least one SSD to replicate data associated with the first write command in the secondary storage area of the at least one SSD where the second write command may be a replica or a modified version of the first write command. If the SoE controller is operating in the erasure-coding mode or a combination of the replication mode and the erasure-coding mode, the SoE controller in response to the first write command may at least: send a first read command to the at least one SSD. The SoE controller may receive stored data in response to the first read command and may determine a new erasure coding based on the first write command. The SoE controller may send a third write command associated with the new erasure coding to the at least one SSD.

An example embodiment provides a method to provide storage offload functionality in an Ethernet solid-state drive (eSSD) system in which the method may include: receiving, at a storage-offload engine (SoE) controller of the eSSD system, a first write command sent from a remote device to at least one SSD of the eSSD system where the eSSD system may include the at least one SSD and an Ethernet switch coupled to the at least one SSD, the at least one SSD may include a primary storage area and a secondary storage area, and the first write command may store data in the at least one SSD; and sending, by the SoE controller, a second write command to the at least one SSD to replicate data associated with the first write command in the secondary storage area where the second write command may be a replica or a modified version of the first write command.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail so as not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein provides an Ethernet solid-state drive (eSSD) system that may include a storage-offload engine that provides compute tasks that may be related to storage functionality. In one embodiment, the storage-offload engine may decode non-volatile memory express (NVMe) packets, and in response to the decoding, may perform certain tasks that are best accomplished external to an SSD, such as, but not limited to, arranging for replication and/or erasure coding. By having the storage-offload engine arrange replication, the limitation of an SSD to act as an initiator is eliminated, and in addition, the bandwidth is more efficiently utilized compared to a system in which one of the SSDs managed the replication for a plurality of SSDs. Regarding erasure coding, the amount of data that would need to be transferred between drives would also be significantly reduced in comparison to a system in which one drive receives a write, develops the erasure-code portions, then distributes the erasure-code portions to other drives. Thus, a system according to the subject matter disclosed herein provides a write throughput for any SSD in the system that is not adversely impacted by replication traffic and/or erasure-coding traffic from peers. In one embodiment, a storage-offload engine according to the subject matter disclosed herein may include a processor embedded in an Ethernet switch that runs storage-offload software and that provides functionality such as, but not limited to, arranging for replication and/or erasure coding. Moreover, a system according to the subject matter disclosed herein increases IO determinism and improves latency and throughput associated with other storage functionalities such as, but not limited to, local reconstruction code (LRC) erasure coding, data move operations and file cloning.

Figure 1:
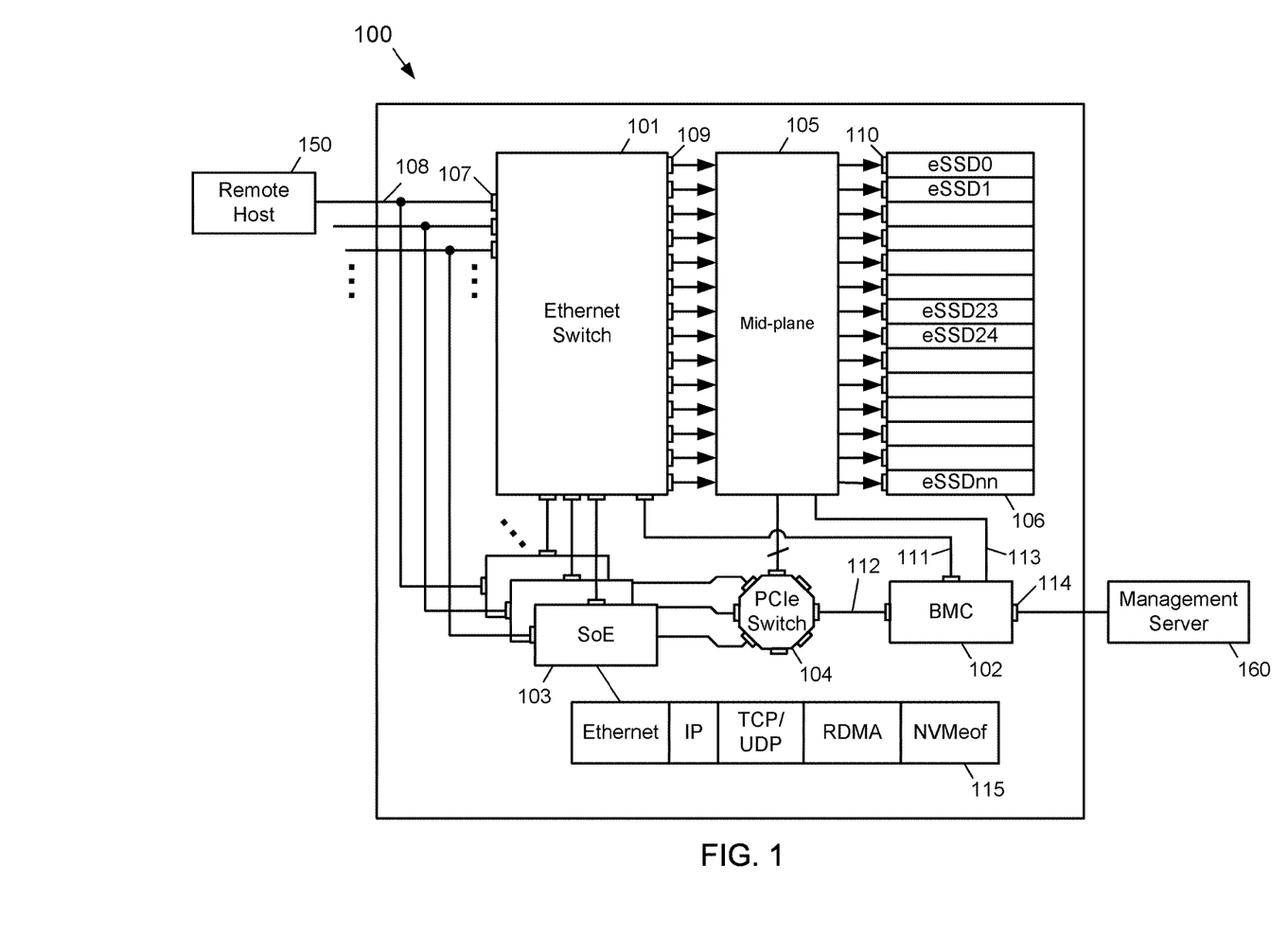
FIG. 1 depicts a block diagram of an example embodiment of a system that includes a storage-offload engine according to the subject matter disclosed herein.

FIG. 1 depicts a block diagram of an example embodiment of a system 100 that includes a storage-offload engine according to the subject matter disclosed herein. The system 100 may include an Ethernet switch 101, a baseboard management controller (BMC) device 102, one or more storage-offload engine (SoE) controllers 103, a peripheral component interconnect express (PCIe) switch 104, a midplane 105, and a plurality of eSSDs 106.

Although the system 100 is depicted in FIG. 1 as including only one Ethernet switch 101 and only one PCIe switch 104, it should be understood that system 100 may include multiple Ethernet switches 101, multiple SoE controllers 103 and/or multiple PCIe switches 104. Additionally, the components forming the system 100, i.e., the Ethernet switch 101, the BMC device 102, the SoE controller 103, the PCIe switch 104, the eSSDs, etc., may be embodied as separate components or as separate modules. Alternatively, two or more of the components or modules forming the system 100 may be integral with each other.

The system 100 may be physically embodied as a chassis, or as a rack unit, in which one or more of the eSSDs 106 may be locally arranged with respect to the system 100. One or more additional eSSDs 106 (not shown) may also be remotely located with respect to the system 100. In one embodiment, the eSSDs 106 may be arranged in a primary group of eSSDs (i.e., eSSDs0-eSSD23) and a secondary group of eSSDs (i.e., eSSD24-eSSD47). The primary group of eSSDs may be used as a primary storage resource and the secondary group of eSSDs may be a replication storage resource. It should be understood that FIG. 1 does not specifically depict all of the eSSDs (eSSDs0-eSSD23) and all of the secondary eSSDs (eSSD24-eSSD47). In another embodiment, the system 100 may include at least one eSSD 106 that has been partitioned to include a primary storage area and a secondary storage area. In another embodiment, the system 106 may comprise a plurality of eSSDs 106 in which one or more eSSDs 106 may be considered to be primary eSSDs, one or more eSSDs 106 may be considered to be secondary eSSDs, and/or one or more eSSDs 106 may have each been partitioned to include a primary storage area and a secondary storage area.

In one embodiment, the system 100 may include 48 eSSDs 106. In still another embodiment, the system 100 may include any number of eSSDs 106. In one embodiment, the eSSDs 106 may be logically organized into one or more subsets of eSSDs 106 in which each subset may include one or more management policies that are applied to the subset.

The Ethernet switch 101 may include a plurality of uplink Ethernet ports 107, of which only three up-link ports 107 are depicted in FIG. 1. The uplink ports 107 may connect the Ethernet switch 101 to one or more remote hosts 150, of which only one host 150 is depicted, through an Ethernet link 108. The uplink port 107 of the Ethernet switch 101 that connects to the remote host 150 may be a high-bandwidth link. In one embodiment, the uplink ports 107 of the Ethernet switch 101 may include multiple 25 gigabits/second (Gbit/s), 40 Gbit/s, 100 Gbit/s and/or higher capacity links. The Ethernet switch 101 may also include a plurality of downlink Ethernet ports 109 that connect to the eSSDs 106 through the mid-plane 105. Each of the eSSDs 106 may be communicatively coupled to the Ethernet switch 101 through an Ethernet connection. That is, each of the eSSDs 106 may include an Ethernet port 110.

In one embodiment, the BMC device 102 may be located in a main switch board that is part of the system 100. In another embodiment, the BMC device 102 and the Ethernet switch 101 may be integral with each other. The BMC device 102 may be configured to provide management functions, such as, but not limited to, discovery, configuration, operational status, and health monitoring of each respective eSSDs 106.

In one embodiment of the system 100, there may be three communication paths between the BMC device 102 and the eSSDs 106 that may be used for the management functions provided by the BMC device 102. A first communication path may be over an Ethernet network 111 through the Ethernet switch 101. A second communication path may be over a PCIe link, or bus, 112 through the PCIe switch 104 and the mid-plane 105, although FIG. 1 does not specifically depict a PCIe link between the mid-plane 105 and an eSSD 106. A third path may be through a system management bus (SMBus) 113 that is connected between the BMC device 102 and the eSSDs 106. The system SMBus 113 may pass through the mid-plane 105 or may be connected directed to the eSSDs 106; although an SMBus connection is not specifically depicted in FIG. 1 between an eSSD 106 and the BMC device 102 and/or the mid-plane 105. The BMC device 102 may also include a management port 114 through which a management server 160 that is operated by an administrator (a user) may communicate with and control the BMC device 102. The management server 160 may be located in proximity to or remotely from the eSSD system 100. The BMC device 102 may receive management information from the management server 160 relating to one or more eSSDs 106 that may be used to control and manage the one or more eSSDs 106.

The SoE controller(s) 103 may be coupled to the Ethernet links 107 that are input to the Ethernet switch 101. In one embodiment, the system 100 may include an SoE controller 103 that is coupled to each respective Ethernet link 107 that is input to the Ethernet switch 101. That is, the system 100 may include an SoE controller 103 for each respective Ethernet link 107 of the Ethernet switch 101. In another embodiment, the system 100 may include a single SoE controller 103 that is coupled to all of the Ethernet links 107 that are input to the Ethernet switch 101. In one embodiment, the SoE controller 103 may also be communicatively coupled to the eSSDs 106 through the PCIe switch 104 and/or the SMBus 113, although not specifically depicted.

In one embodiment, the SoE controller 103 may include one or more special-purpose field-programmable gate arrays (FPGAs) and/or application specific integrated circuits (ASICs) that may decode NVMe-oF packets, and may perform certain tasks, such as, but not limited to, arranging and performing the replication and/or erasure coding (EC). In one embodiment, the SoE controller 103 may operate in a replication mode, EC mode, and/or any other storage-offload functionality mode. That is, the SoE controller 103 may decode NVMe-oF packets that may be contained in Ethernet traffic between the system 100 and a remote host 150, and provide replication-mode and/or EC-mode functionality. In the replication mode, the SoE controller 103 provides the functionality to replicate data written to one or more primary SSDs on corresponding one or more secondary SSDs. Such replication-mode functionality may also include, but is not limited to, data movement and file cloning. In the EC mode, the SoE controller 103 provides the functionality to determine EC codes for data written to one or more of the primary SSDs, and to assemble data based on the EC codes for the data in response to a read command. The SoE controller 103 may also operate in a combined replication/EC mode.

In one embodiment, the SoE controller 103 may provide management functionality of the replicated, or secondary, eSSDs that support the primary eSSDs. In an alternative embodiment, the SoE controller 103 may include a general-purpose or a specialized processor that runs storage-offload software that provides functionality such as, but not limited to, arranging for replication and/or EC. In one embodiment, the BMC device 102 may provide some or all of the management functionality of the secondary eSSDs. The management functionality may include indicating the primary and secondary eSSDs for replication or indicating the EC peer nodes in EC mode. In one embodiment, the SoE controller 103 and the BMC device 102 may be integrated with each other. In one embodiment, discovery service logs in the Ethernet switch 101 may be populated and maintained by the SoE controller 103. Initialization commands for the eSSDs may be performed by the SoE controller 103, and the SoE controller 103 may maintain states of the commands in real time (i.e., "in flight"). The SoE controller 103 may also maintain an EC group (i.e., data nodes and EC nodes), and the states of the commands in flight.

In one embodiment, Ethernet traffic between a remote host 150 and the system 100 may use a protocol that may be based on the NVMe-oF specification to send read/write IO commands to the eSSDs 106. As indicated at 115 in FIG. 1, in one embodiment, the SoE controller 103 may decode a communication protocol based on, but not limited to, an Ethernet protocol, a protocol based on an Internet Protocol (IP), a protocol based on a transmission control protocol (TCP), a protocol based on a user datagram protocol (UDP), a protocol based on a remote direct memory access (RDMA) protocol, and a protocol based on a NVMe-oF protocol, or a combination thereof. In one embodiment, the SoE controller 103 may receive and decode the NVMe-oF capsules contained in the Ethernet traffic between the system 100 and remote hosts 150. That is, the SoE controller 103 may process the received packets to provide compute/functionality tasks that may be related to storage functionality of the system 100 and the eSSDs 106.

Figure 2:
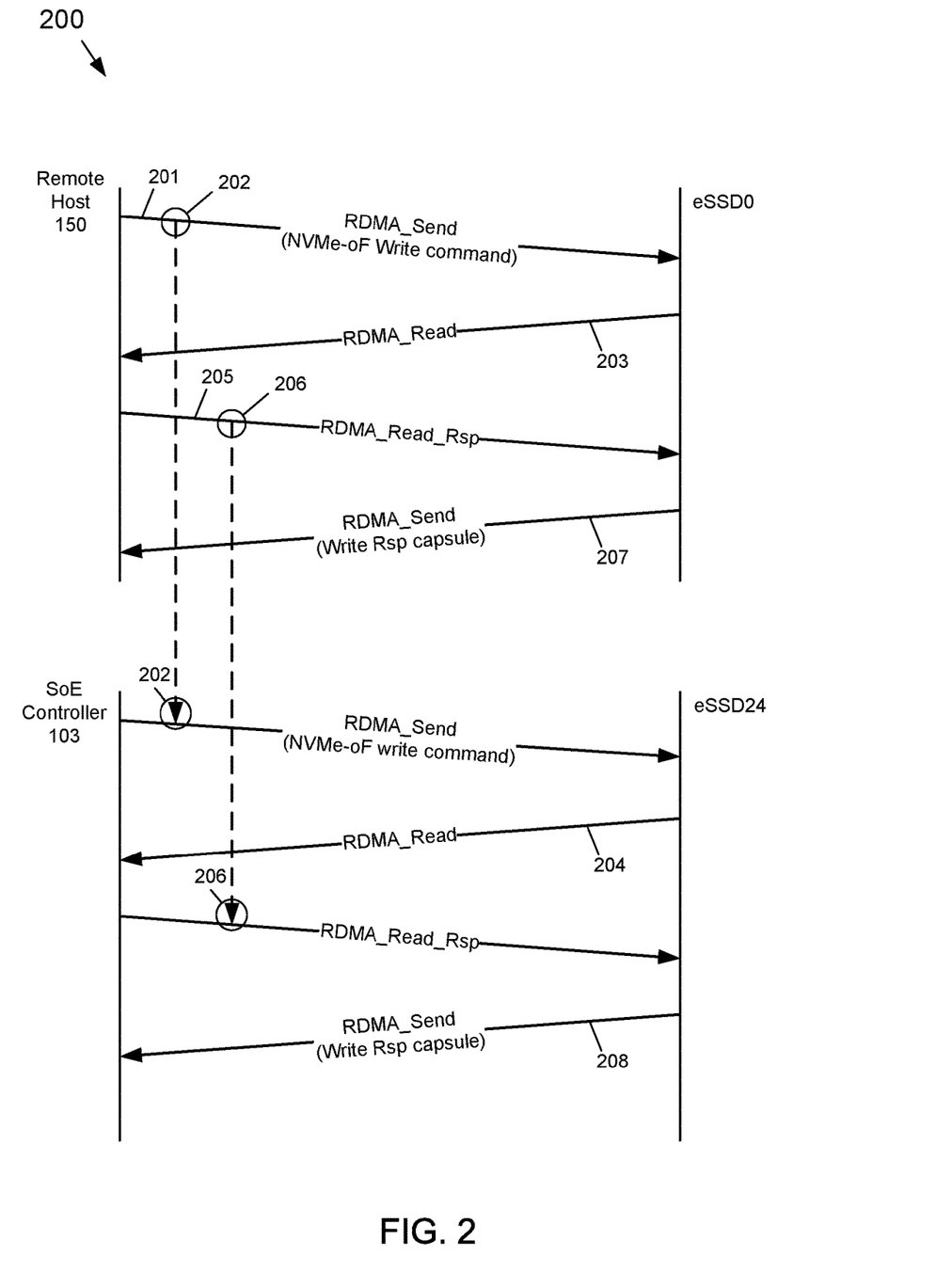
FIG. 2 depicts an example flow diagram of the example system of FIG. 1 responding to a write command if an SoE controller of the system is in a replication mode according to the subject matter disclosed herein.

FIG. 2 depicts an example flow diagram 200 of the system 100 responding to a write command if the SoE controller 103 is in a replication mode according to the subject matter disclosed herein. For the example flow diagram 200 depicted in FIG. 2, system 100 may be configured to include one or more primary SSDs and one or more secondary SSDs. At 201 in FIG. 2, an RDMA_Send message containing an NVMe-oF write command is sent from a remote initiator (such as remote host 150) to, for example, the eSSD0 (a "primary"). The SoE controller 103 receives and decodes the NVMe-oF write command, which triggers, or causes, the SoE controller 103 at 202 to initiate and send a "replica" of the RDMA_Send message containing the NVMe-oF write command to a replication eSSD, such as eSSD24. The "replica" NVMe-oF write command may not be an exact copy of the original write command as some of the fields and parameters of the NVMe-oF command may be modified to enable and/or enhance replication functionality. At 203, the primary eSSD0 responds to the received RDMA_Send message by sending an RDMA_Read message to the remote host 150. At 204, the replication eSSD24 also responds with its own RDMA_Read message, which is sent to the SoE controller 103. At 205, in response to the RDMA_Read message sent at 203, the remote host 150 sends an RDMA_Read_Rsp message to the primary eSSD0. At 206, the SoE controller 103 receives and decodes the RDMA_Read_Rsp, which triggers, or causes, the SoE controller 103 to initiate and send a replica of the RDMA_Read_ Rsp capsule to the replication eSSD24. In one embodiment, the replica of the RDMA_Read_Rsp capsule may not be an exact copy of the original RDMA_Read_Rsp message received from the remote host 150. At 207, the primary eSSD0 responds with NVMe-oF write response message using RDMA_Send, and independently at 208, the replication eSSD24 responds with its own RDMA_Send write response message.

If the system 100 is in the replication mode, a read to a primary eSSD (e.g., eSSD0) may be serviced in a normal manner. In event of a failure of a primary eSSD, the BMC device 102 may indicate the failure to the SoE controller 103, and the SoE controller 103 may send read requests to one or more secondary eSSDs (e.g., replicated to eSSD24) and return the data to the initiator.

For a system 100 that is configured to include one or more SSDs that have been partitioned to have a primary storage area and a secondary storage area, the flow will be similar to the flow depicted in FIG. 2, except that rather than the SoE controller 103 sending replicas (or modified versions) of commands received from a remote host to secondary SSDs, the SoE controller 103 sends replicas (or modified versions) of commands received from a remote host to write data in secondary areas of one or more SSDs.

Figure 3:
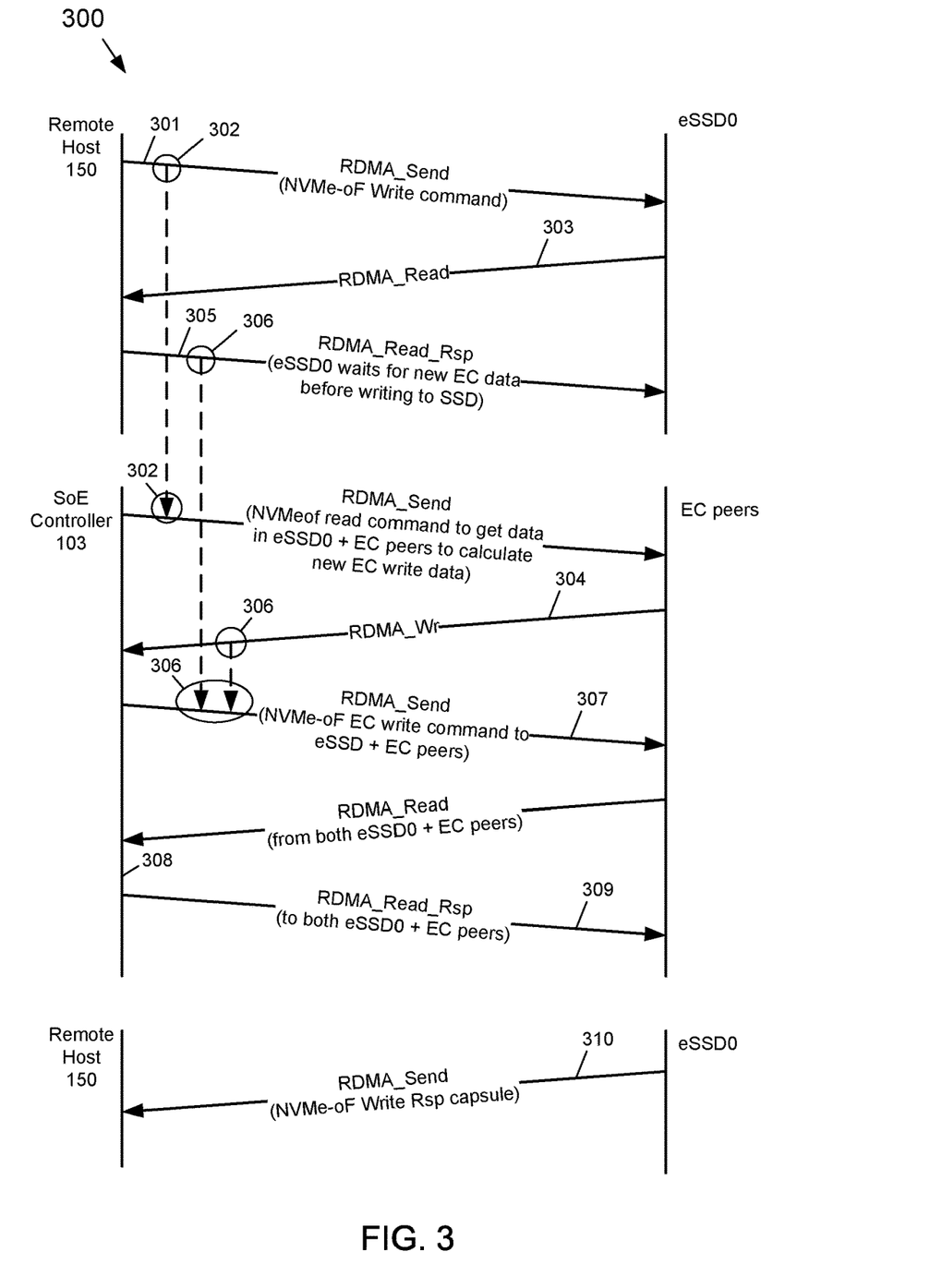
FIG. 3 depicts an example flow diagram of the example system of FIG. 1 responding to a write command if an SoE controller of the system is in an erasure-coding mode according to the subject matter disclosed herein.

FIG. 3 depicts an example flow diagram 300 of the example system 100 of FIG. 1 responding to a write command if the SoE controller 103 is in an EC mode according to the subject matter disclosed herein. For the example flow diagram 300 depicted in FIG. 3, system 100 may be configured to include one or more primary SSDs and one or more secondary SSDs. At 301 in FIG. 3, an RDMA_Send message containing an NVMe-oF write command is sent from a remote initiator (such as remote host 150) to, for example, the eSSD0. The SoE controller 103 receives and decodes the NVMe-oF write command, which triggers, or causes, the SoE controller 103 at 302 to initiate and send an RDMA_Send message containing a NVMe-oF read command to the eSSD0 and the EC group peers of the eSSD0 to obtain the data that will be affected by the NVMe-oF write command received at 301. At 303, the eSSD0 responds to the RDMA_Send message and sends an RDMA_Read message to the remote host 150. At 304, the eSSD0 and the EC peers send an RDMA_Wr message to the SoE controller 103. At 305, the remote host 150 sends an RDMA_Read_Rsp message containing new data that is to be written to the eSSD0, but the eSSD0 waits for the new EC data that the SoE controller 103 will determine. The RDMA_Read_Rsp message received and decoded at 305 by the SoE controller 103 and the RDMA_Wr message at 304 received and decoded by the SoE controller 103 together triggers, or causes, the SoE controller 103 at 306 to send an RDMA_Send message containing NVMe-oF write commands to the eSSD0 and EC peers. After 307, the eSSD0 and the EC group peers send to the SoE controller 103 an RDMA_Read message to get the write data. At 308, the SoE controller 103 determines the updated write data for eSSD0 and stripes the data including EC data on to EC group peers, thereby implementing the EC storage-offload functionality for the first NVMe-oF write command received at 301. At 309, the SoE controller 103 sends an RDMA_Read_Rsp message to the eSSD0 and EC group peers containing the updated write data and the updated EC code. At 310, the eSSD0 sends to the remote host 150 an RDMA_Send message containing an NVMe-oF write response capsule.

For a system 100 that is configured to include one or more SSDs that have been partitioned to have a primary storage area and a secondary storage area, the flow will be similar to the flow depicted in FIG. 3, except that rather than the SoE controller 103 sending replicas (or modified versions) of commands received from a remote host to secondary SSDs, the SoE controller 103 sends replicas (or modified versions) of commands received from a remote host to write and read data in primary and secondary areas of one or more SSDs.

Figure 4:
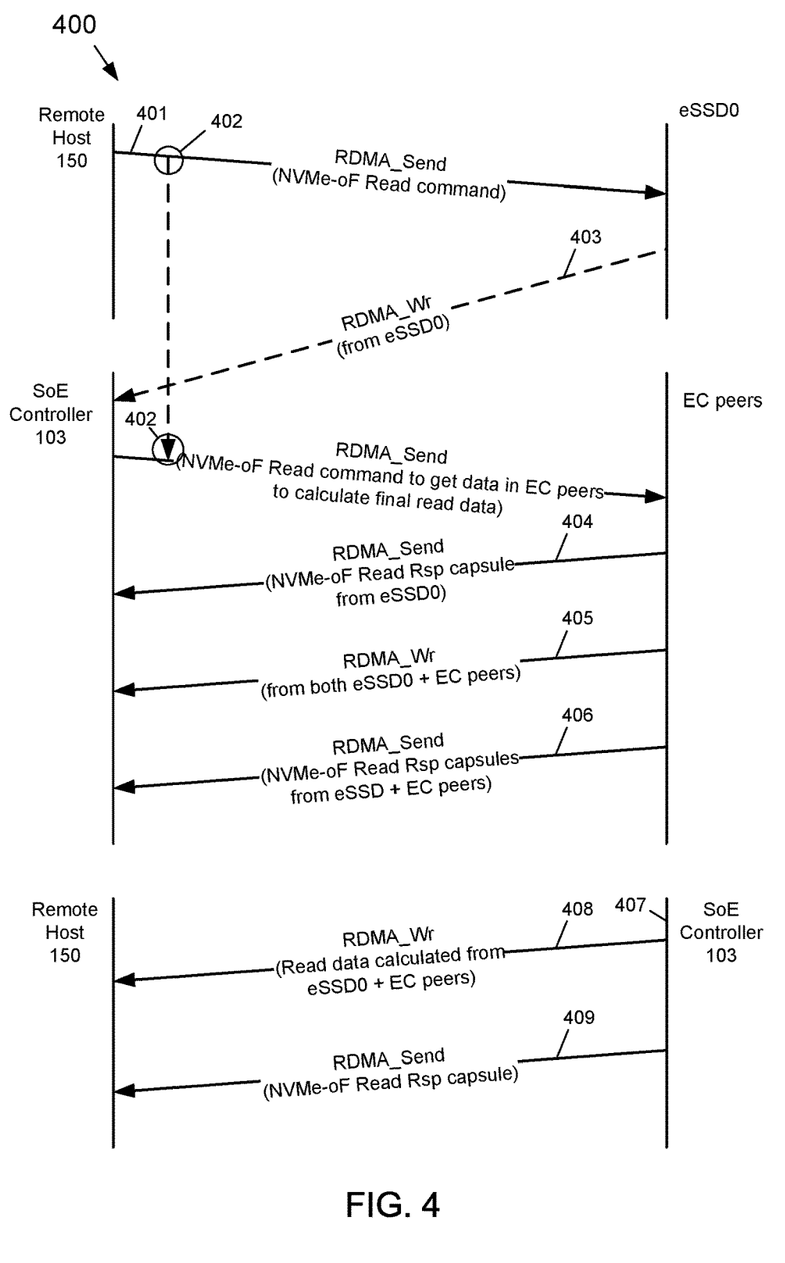
FIG. 4 depicts an example flow diagram of the example system of FIG. 1 responding to a read command if an SoE controller of the system is in an erasure-coding mode according to the subject matter disclosed herein.

FIG. 4 depicts an example flow diagram 400 of the example system 100 of FIG. 1 responding to a read command if the SoE controller 103 is in an EC mode according to the subject matter disclosed herein. For the example flow diagram 400 depicted in FIG. 4, system 100 may be configured to include one or more primary SSDs and one or more secondary SSDs. At 401 in FIG. 4, an RDMA_Send message containing an NVMe-oF read command is sent from a remote initiator (such as remote host 150) to, for example, the eSSD0. The SoE controller 103 receives and decodes the NVMe-oF read command, which triggers, or causes, the SoE controller 103 at 402 to initiate and send an RDMA_Send message containing a NVMe-oF read command to the eSSD0 and the EC group peers of the eSSD0 to obtain the data and EC codes that will be used to assemble the data that has been requested at 401. At 403, the eSSD0 sends to the SoE controller 103 an RDMA_Write message. At 404, the eSSD0 responds to the SoE controller 103 with an RDMA_Send message containing an NVMe-oF read response capsule. At 405, the eSSD0 and the EC peers send an RDMA_Wr message with data to the SoE controller 103. At 406, the read response is sent from the eSSD0 and the EC peers in RDMA_Send messages. At 407, the SoE controller 103 assembles the requested data. At 408, the SoE controller 103 sends an RDMA_Wr message to the remote host containing the assembled read data. In a situation in which the SoE controller 103 is able to assemble the requested data before all EC peers have responded, the SoE controller 103 sends the requested data to the remote host 150. At 409, the SoE controller 103 sends to the remote host 150 an RDMA_Send message containing an NVMe-oF read response capsule.

For a system 100 that is configured to include one or more SSDs that have been partitioned to have a primary storage area and a secondary storage area, the flow will be similar to the flow depicted in FIG. 4, except that rather than the SoE controller 103 sending replicas (or modified versions) of commands received from a remote host to secondary SSDs, the SoE controller 103 sends replicas (or modified versions) of commands received from a remote host to write and read data in primary and secondary areas of one or more SSDs.

It should be understood that in one embodiment, the system 100 may operate in a combination of a data replication mode and an erasure-coding mode, in which case the system 100 may perform at least the operations depicted in FIGS. 2-4 depending on the particular command received from a remote host.

It should also be understood that the example flow diagrams in FIGS. 3 and 4 are depicted as using an RDMA protocol as an example, but the storage-offload functionalities and flows may be adopted and implemented in the fabric switch and eSSD using, for example, an NVMe-TCP protocol or any other protocols that may be approved by the NVMe Working Group.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. An Ethernet solid-state drive (eSSD) system, comprising:
   at least one primary SSD;
   at least one secondary SSD;
   an Ethernet switch coupled to the at least one primary SSD and the at least one secondary SSD; and
   a storage-offload engine (SoE) controller coupled to the Ethernet switch, the at least one primary SSD and the at least one secondary SSD, the SoE controller configured to operate in a replication mode, in an erasure-coding mode, or in a combination thereof, and the SoE controller configured to receive a first write command sent from a remote device to the at least one primary SSD,
      if the SoE controller is operating in the replication mode or a combination of the replication mode and the erasure-coding mode, the SoE controller, in response to the first write command, is configured to at least: send a second write command to the at least one secondary SSD to replicate data associated with the first write command in the at least one secondary SSD, the second write command being a replica or a modified version of the first write command,
      if the SoE controller is operating in the erasure-coding mode or a combination of the replication mode and the erasure-coding mode, the SoE controller, in response to the first write command, is configured to at least: send a first read command to the at least one primary SSD and to erasure-coding peers of the at least one primary SSD, the SoE controller is configured to receive stored data in response to the first read command and to determine a new erasure coding based on the first write command, and the SoE controller is configured to send a third write command associated with the new erasure coding to the at least one primary SSD and to erasure-coding peers of the at least one primary SSD.

2. The system of claim 1, wherein in the erasure-coding mode, the SoE controller is configured to receive a second read command sent from the remote device to the at least one primary SSD, the SoE controller is configured to receive stored data and erasure coding associated with the stored data associated with the second read command and to assemble the received data and the received erasure coding associated with the received data, and the SoE controller is configured to send the assembled data to the remote device for the second read command.

3. The system of claim 1, wherein the SoE controller is further configured to receive a data-cloning command from the remote device sent to the at least one primary SSD, the SoE controller being configured to control cloning of data associated with the data-cloning command in at least the at least one primary SSD.

4. The system of claim 1, wherein the SoE controller is further configured to receive a data-movement command from the remote device sent to the at least one primary SSD, the SoE controller being configured to control movement of data associated with the data-movement command within at least the at least one primary SSD.

5. An Ethernet solid-state drive (eSSD) system, comprising:
   at least one SSD, the at least one SSD comprising a primary storage area and a secondary storage area;
   an Ethernet switch coupled to the at least one SSD; and
   a storage-offload engine (SoE) controller coupled to the Ethernet switch and the at least one SSD, the SoE controller configured to operate in a replication mode, in an erasure-coding mode, or in a combination thereof, and the SoE controller configured to receive a first write command sent from a remote device to the at least one SSD,
      if the SoE controller is operating in the replication mode or a combination of the replication mode and the erasure-coding mode, the SoE controller, in response to the first write command, is configured to at least: send a second write command to the at least one SSD to replicate data associated with the first write command in the secondary storage area of the at least one SSD, the second write command being a replica or a modified version of the first write command,
      if the SoE controller is operating in the erasure-coding mode or a combination of the replication mode and the erasure-coding mode, the SoE controller, in response to the first write command, is configured to at least: send a first read command to the at least one SSD, the SoE controller is configured to receive stored data in response to the first read command and to determine a new erasure coding based on the first write command, and the SoE controller is configured to send a third write command associated with the new erasure coding to the at least one SSD.

6. The system of claim 5, wherein in the erasure-coding mode, the SoE controller is configured to receive a second read command sent from the remote device to the at least one SSD, the SoE controller is configured to receive stored data and erasure coding associated with the stored data associated with the second read command and to assemble the received data and the received erasure coding associated with the received data, and the SoE controller is configured to send the assembled data to the remote device for the second read command.

7. The system of claim 5, wherein the SoE controller is further configured to receive a data-cloning command from the remote device sent to the at least one SSD, the SoE controller being configured to control cloning of data associated with the data-cloning command in the at least one SSD.

8. The system of claim 5, wherein the SoE controller is further configured to receive a data-movement command from the remote device sent to the at least one SSD, the SoE controller being configured to control movement of data associated with the data-movement command within the at least one SSD.

* * * * *